(12) United States Patent
Reyes

(10) Patent No.: US 8,600,879 B2
(45) Date of Patent: Dec. 3, 2013

(54) METHOD AND SYSTEM FOR EFFECTING PAYMENT BY CHECKS THROUGH THE USE OF IMAGE REPLACEMENT DOCUMENTS

(75) Inventor: Thomas D. Reyes, Rancho Cucamonga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2400 days.

(21) Appl. No.: 10/634,635

(22) Filed: Aug. 5, 2003

(65) Prior Publication Data

US 2005/0033685 A1 Feb. 10, 2005

(51) Int. Cl.
*G06Q 40/00* (2012.01)

(52) U.S. Cl.
USPC ............................................. 705/39; 705/35

(58) Field of Classification Search
USPC ............................................. 705/39, 35, 45
See application file for complete search history.

(56) References Cited

U.S. PATENT DOCUMENTS

| | | | |
|---|---|---|---|
| 5,832,463 A | | 11/1998 | Funk |
| 6,978,046 B2 * | | 12/2005 | Robinson et al. ............. 382/209 |
| 2002/0164021 A1 | | 11/2002 | Sandru |
| 2004/0044606 A1 * | | 3/2004 | Buttridge et al. ............... 705/35 |
| 2004/0111371 A1 | | 6/2004 | Friedman |

OTHER PUBLICATIONS

Ferguson and Ford; "*A Bill—In The House of Representatives*"; 107th Congress 2d Session H.R. 5414; (pp. 1-32), Sep. 19, 2002.
Notification of Transmittal of the International Search Report and the Written Opinion of the International Searching Authority of International Application No. PCT/US2004/024997; filed Aug. 3, 2004 (11 pages).

* cited by examiner

*Primary Examiner* — Ojo O Oyebisi

(57) ABSTRACT

According to one embodiment of the present invention, a computerized method for effecting payment by a check includes electronically receiving payment information for a check drawing on a checking account of an account holder, retrieving from a storage location an image replacement document template associated with the checking account in response to receiving the payment information, and generating an image replacement document representative of the check by inserting the payment information into respective fields of the image replacement document template. The payment information includes a date, a payee, a dollar amount, a legal amount, and a signature.

16 Claims, 3 Drawing Sheets

FIG. 5

This is a Legal Copy of your draft or check. You may use it the same way you would use the original

[124000054] 01/25/2002
000500144060222

METHOD AND SYSTEM FOR EFFECTING PAYMENT BY CHECKS THROUGH THE USE OF IMAGE REPLACEMENT DOCUMENTS

TECHNICAL FIELD OF THE INVENTION

This invention is related in general to the field of check processing. More particularly, the invention is related to a method and system for effecting payment by checks through the use of image replacement documents ("IRDs").

BACKGROUND OF THE INVENTION

The typical check processing procedure begins, for example, at a retailer or point-of-sale. The cashier enters all the purchases and the register provides a total. The customer writes out a check for a specific dollar amount and presents it as payment for the amount owed. If the account has not been black listed, then the checking account owner may leave the retailer with the goods that were purchased. At the end of the day, all checks are deposited with the retailer's bank.

An encoding process is then performed manually, with an operator physically handling each check, viewing the amount, and then keying it on the face of the check. The encoding speed per operator is typically 1,200 to 1,400 checks per hour. The encoded checks are then tallied and compared with the total on the deposit ticket. This process is commonly termed "proofing."

The encoded checks are then shipped to a central processing location for the "capturing" step. High speed reader/sorters process the checks by reading and sorting the checks according to information printed on the MICR (magnetic ink character recognition) line located at the bottom of the check. The MICR information on the check includes the bank number, account number, check serial number, in addition to the encoded check amount. The checks are read and sorted by bank or some other designation according to the transit and routing information also present in the MICR line. A balance of credits and debits is then computed. The sorted checks and a cash letter listing each check and their amounts are then sent in a collection and transit process to the institutions owning the accounts that the checks are drawn on.

The transit process delivers the checks to the bank having the accounts the checks are drawn on, at which place another capturing process commonly termed "inclearing" is performed. Inclearing ensures that the checks are actually drawing on that bank's accounts, the amounts are encoded on the checks, the correct settlement amount is given to the other banks, and that the correct amount is finally settled or posted out of the customer's account. The checks may then be optionally returned to the checking account owner.

The period of time starting from tendering check at the point-of-sale to the time the check is finally funded by the money in the customer's account is called the "float" period. Typically, the float period may be up to two to three days. Consequently, collection is a very timely process for banks and businesses. In addition, the collection process is costly and somewhat risky due to the proofing, capturing, and inclearing steps noted above.

SUMMARY OF THE INVENTION

According to one embodiment of the present invention, a computerized method for effecting payment by a check includes electronically receiving payment information for a check drawing on a checking account of an account holder, retrieving from a storage location an image replacement document template associated with the checking account in response to receiving the payment information, and generating an image replacement document representative of the check by inserting the payment information into respective fields of the image replacement document template. The payment information includes a date, a payee, a dollar amount, a legal amount, and a signature.

According to another embodiment of the present invention, a computerized method for effecting payment by a check includes generating an electronic image of a check drawing on a checking account of an account holder on an output device, receiving payment information for the check on the output device, generating a snippet of the payment information, and electronically transmitting the snippet to a remote location for generation of an image replacement document representative of the check based on the snippet.

The present invention may provide one or more technical advantages. Various embodiments of the present invention may provide some, all or none of these technical advantages. One such technical advantage is the lower cost of check processing through, for example, the elimination of high speed check capture devices and the software required to run them. In addition, transportation costs are eliminated. In fact, check images for check collection may be transmitted with ease anywhere in the United States without the use of powerful networks. Another technical advantage is that account holders only have to carry a "smart card" or other similar item instead of having to lug around a check book full of paper checks, which are easily damaged by various causes. An electronic check image may be utilized via any number of electronic devices, such as mobile telephones, personal digital assistants, laptops, and point-of-sale devices.

Other advantages may be readily ascertainable by those skilled in the art from the following figures, description, and claims.

BRIEF DESCRIPTION OF THE DRAWINGS

For a more complete understanding of the present invention and its advantages, reference is now made to the following descriptions, taken in conjunction with the accompanying drawings, in which:

FIG. 5 illustrates an image replacement document representative of the electronic check of FIG. 3.

DETAILED DESCRIPTION OF EXAMPLE EMBODIMENTS OF THE INVENTION

Example embodiments of the invention are best understood by referring to FIGS. 1 through 6 of the drawings, like numerals being used for like and corresponding parts of the various drawings.

Figure 1:
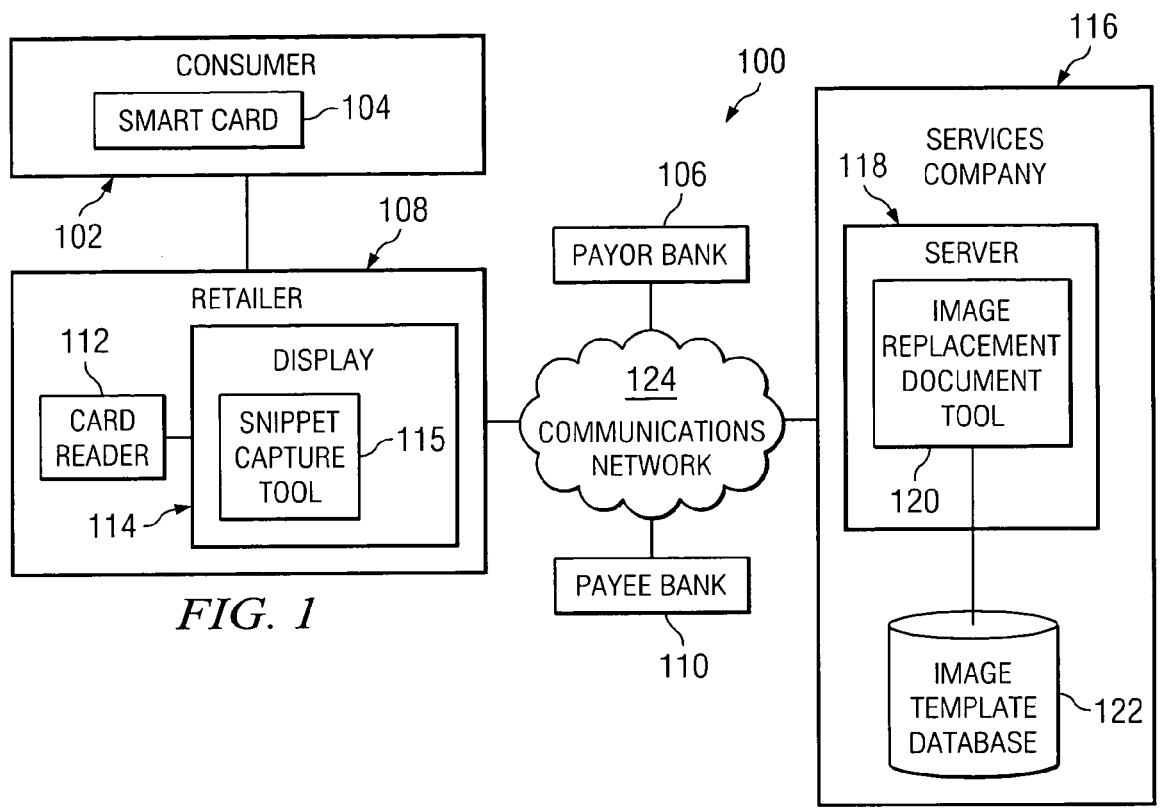
FIG. 1 is a block diagram of a system for effecting payment by checks through the use of image replacement documents according to an embodiment of the present invention.

FIG. 1 is a block diagram of a system 100 for effecting payment by checks through the use of image replacement documents according to one embodiment of the present invention. As used herein, an image replacement document is a document constructed from electronic information that replaces an original check and has the same legal effect as the original check. One technical advantage of using image replacement documents is lower cost of check processing through, for example, elimination of high speed check capture devices and software required to run them. In addition, transportation costs associated with the physical transfer of checks may be eliminated. Account holders may also benefit by not having to carry around a checkbook full of paper checks, which can be easily damaged or misplaced.

In the illustrated embodiment, system 100 includes a consumer 102 that has been issued a smart card 104 by a payor bank 106. Consumer 102 wishes to purchase goods from a retailer 108 that banks with a payee bank 110. Retailer 108 includes a card reader 112 and an associated display 114 having a snippet capture tool 115. System 100 also includes a services company 116 that provides an image replacement document service, as described in more detail below in conjunction with FIGS. 2 through 6. Services company 116 includes a server 118 having an image replacement document ("IRD") tool 120 stored therein and an image template database 122 coupled to server 118. Services company 116, payor bank 106, payee bank 110, and retailer 108 are all communicatively coupled to one another via a communications network 124 which may be any suitable wireline or wireless communications network, or combination of wireline or wireless communications networks, that facilitate communication of information and data between remote end points. Some examples of communications network 124 may include one or more local area networks, metropolitan area networks, wide area networks, all or a portion of a global computing network such as the Internet, a virtual private network, or any other suitable communications system or systems at one or more locations.

Although in the illustrated embodiment, consumer 102 is purchasing goods from retailer 108, the present invention contemplates any suitable situation in which consumer 102, which may be any suitable account holder, wishes to utilize a check for payment of goods and/or services, deposit of money, or withdrawal of money. Accordingly, display 114 and snippet capture tool 115 may be disposed at any suitable location, such as a bank branch.

Smart card 104 may be any suitable device that stores an image of a check for consumer 102. For example, smart card 104 may be a smart card, which includes the information on an integrated circuit chip or other suitable semiconductor device or may be a magnetic strip card that includes the information in digital form on a magnetic strip. The present invention contemplates other mediums for the storing of the check image for consumer 102, such as a personal digital assistant, a PC, a mobile telephone, or other device suitable for storing the image of the check. Such an image of a check is illustrated in FIG. 2.

Figure 2:
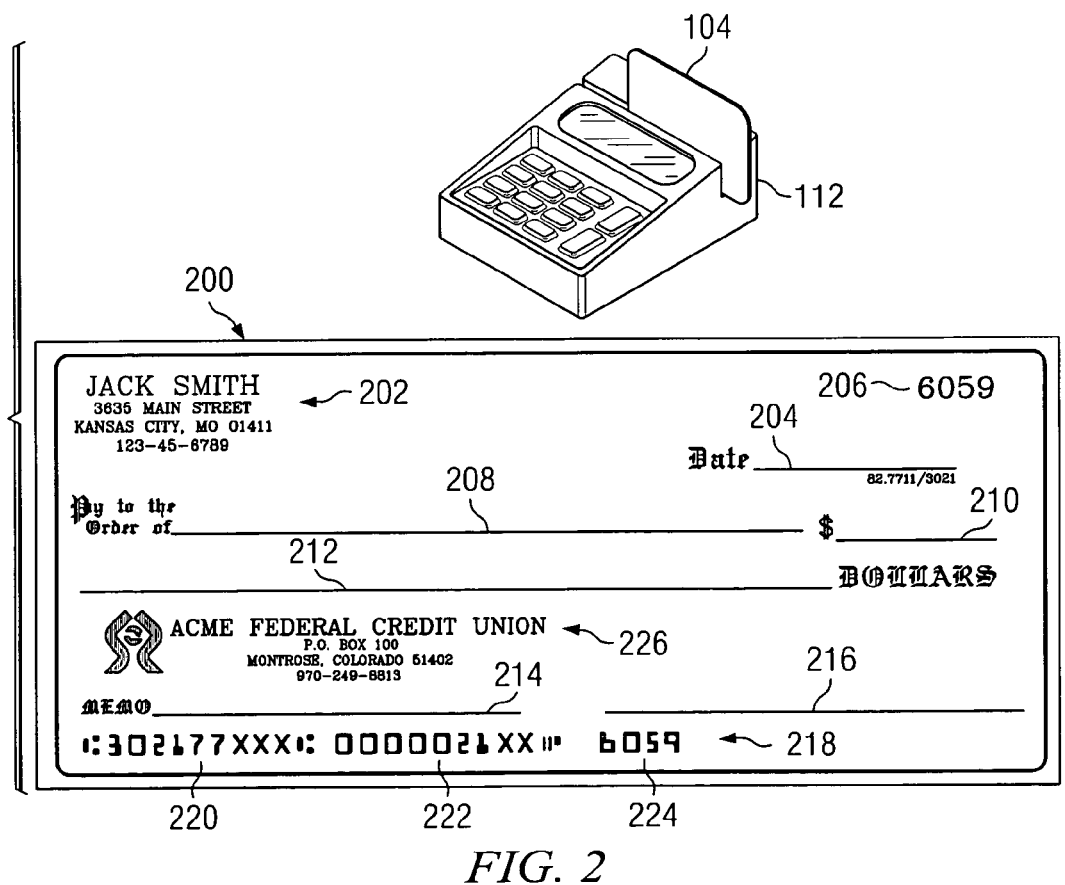
FIG. 2 illustrates an electronic image of a check by the swiping of a smartcard according to one embodiment of the present invention.

Referring to FIG. 2, smart card 104 is shown to be inserted into card reader 112 of retailer 108. Card reader 112 includes functionality suitable to read the information contained on smart card 104 in order to display an image 200 of a check on display 114. Check image 200 appears on display 114 and looks substantially the same as a paper check would look for consumer 102. Accordingly, check image 200 includes an address section 202, a date field 204, a sequence number 206, a payee field 208, a dollar amount field 210, a legal amount field 212, a memo field 214, a signature field 216, and MICR line 218, which includes transit and routing information 220, checking account number 222, and check serial number 224. Check image 200 may also include the name and address of payor bank 106, as indicated by reference numeral 226. After check image 200 appears on display 114, consumer 102 may enter the required payment information for his or her purchase. Such information is entered with a digital pen or other suitable device. The result is shown in FIG. 3.

Figure 3:
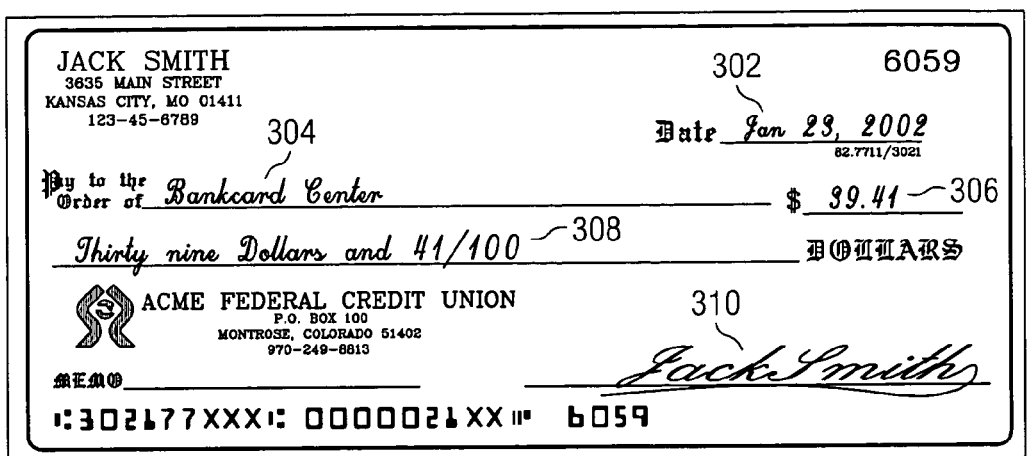
FIG. 3 illustrates the electronic image of the check of FIG. 2 with payment information entered thereon with a digital pen.

FIG. 3 illustrates check image 200 with the required payment information entered thereon. Such payment information that is entered onto check image 200 typically includes a date 302, a payee 304, a dollar amount 306, a legal amount 308, and a signature 310. After the required payment information is entered onto check image 200, retailer 108 accepts check image 300 as payment for the goods by utilizing any suitable acceptance method, such as pressing an accept button associated with display 114. This acceptance method then allows snippet capture tool 115 to capture a snippet of check image 300 for subsequent transfer to payee bank 110. An example of such a snippet is illustrated in FIG. 4.

Figure 4:
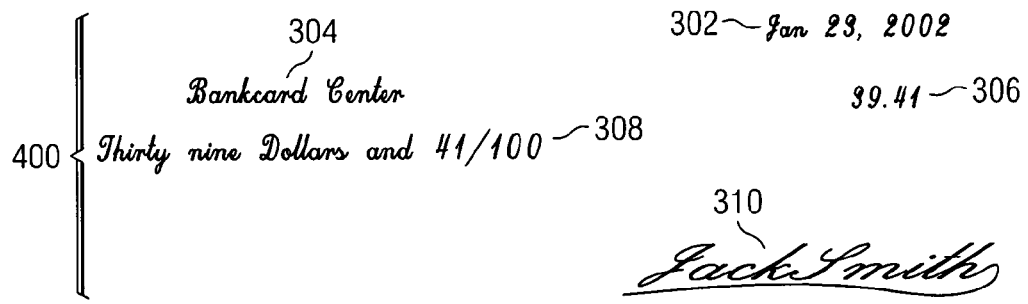
FIG. 4 illustrates a snippet of the payment information of FIG. 3.

FIG. 4 illustrates a snippet 400 of check image 300. Snippet 400, in the illustrated embodiment, includes the entered payment information by consumer 102; namely, date 302, payee 304, dollar amount 306, legal amount 308, and signature 310. Although not explicitly illustrated, snippet 400 also typically includes an endorsement section captured from an image of the backside of check image 300, which represents the endorsement by, for example, retailer 108. A snippet 400 may be stored in any suitable storage location at retailer 108.

A technical advantage of using snippet 400 of check image 300 is that retailer 108 or other suitable entity does not have to capture and store the full check image 300, which typically takes up a lot of storage space. For example, full images of completed checks may take up to 25,000 kilobytes of space. Conversely, snippet 400 takes up very little space (about 1 to 10 kilobytes), which means that high speed check capturing devices and the software required to run them are eliminated and also not as much storage location is required for retailer 108. The network costs for transferring the full images is also greatly reduced.

After payee bank 110 receives snippet 400 from retailer 108 via communications network 124 or other suitable method, payee bank 110 stores snippet 400 in any suitable storage location and then transfers snippet 400 through communications network 124 to services company 116. Payee bank 110, in the illustrated embodiment, has a contract with services company 116 that directs services company 116 to create an image replacement document for check image 300 so that it may be presented to payor bank 106 for payment to payee bank 110.

Services company 116 receives snippet 400 from payee bank 110 over communications network 124 and utilizes IRD tool 120 stored on server 118 to create an image replacement document. Server 118 represents any suitable hardware, firmware, and/or software that is operable to execute computer programs, such as IRD tool 120. Although only one server 118 is illustrated in FIG. 1, the functionality provided by server 118 may be distributed across multiple servers in multiple physical locations.

IRD tool 120 generally functions to receive snippets, such as snippet 400, from payee bank 110 or other suitable entity over communications network 124 in order to create image replacement documents, such as image replacement document 500 illustrated in FIG. 5. With reference to FIG. 5, image replacement document 500 includes a reproduction of check image 300, as noted by reference numeral 502, a legal notification section 504, an image replacement document identification section 506, and a MICR section 508, which resembles MICR line 218 (FIG. 2). Image replacement document 500, as illustrated in FIG. 5, is only one of many forms that an image replacement document may take. Accordingly, the present invention contemplates other forms and types of image replacement documents.

As described above, after IRD tool 120 generates image replacement document 500, then image replacement document 500 may be transferred either physically or electronically to payee bank 110 or other suitable entity in order that the inclearing process may be performed to complete the check processing.

In order to create image replacement document 500, services company 116 includes image template database 122. Image template database 122 stores a plurality of image templates corresponding to the checking accounts of account holders, such as consumer 102. Each image template stored in image template database 122 includes all the pertinent information for the checking account for consumer 102, such as the information shown by check image 200 (FIG. 2). Accordingly, once payment information for a particular transaction is completed by consumer 102, then a snippet may be taken of the filled-in information, such as snippet 400 as shown in FIG. 4, and thereafter transferred to services company 116 via communications network 124. IRD tool 120 may then, in response to receiving snippet 400, retrieve from image template database 122 the pertinent image template corresponding to the checking account of consumer 102 and merge the image template with the snippet received in order to create image replacement document 500. This process is described in more detail below in conjunction with FIG. 6.

Image template database 122 may comprise any suitable storage location that allows the storage and/or retrieval of data. Database 122 may be random access memory, read-only memory, CD-ROM, or removable memory devices. Although only one database 122 is illustrated in FIG. 1, the functionality of database 122 may be spread or distributed across multiple databases in more than one physical location.

Figure 6:
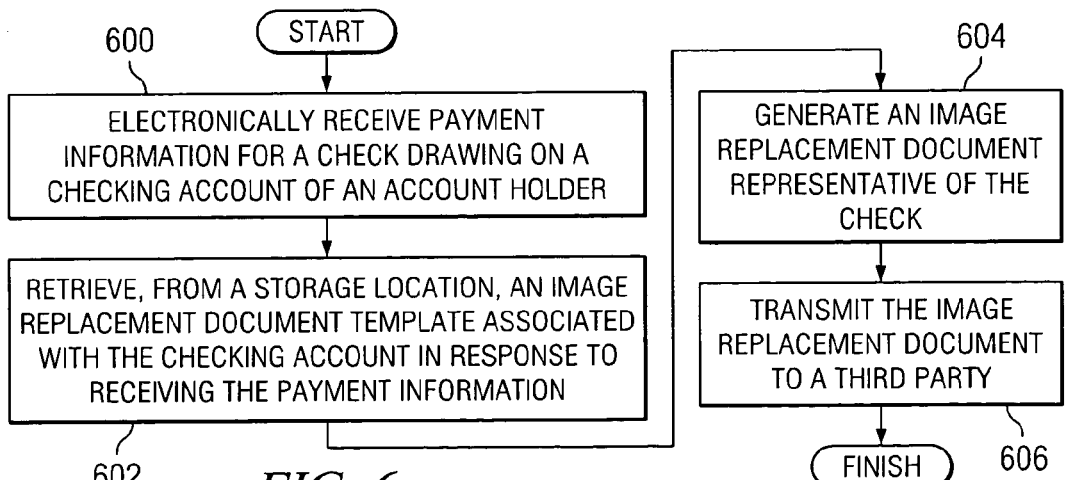
FIG. 6 is a flowchart illustrating a method for effecting payment by checks through the use of image replacement documents according to an embodiment of the present invention

FIG. 6 is a flowchart illustrating a method for effecting payment by checks through the use of image replacement documents according to one embodiment of the present invention. The example method illustrated in FIG. 6 illustrates some of the functionality of IRD tool 120 in order to create image replacement documents, such as image replacement document 500 (FIG. 5).

The example method begins at step 600 where payment information for a check drawing a checking account of an account holder is electronically received by IRD tool 120. The payment information may be received via communications network 124 (FIG. 1) or other suitable electronic medium. In response to receiving payment information, an image replacement document template associated with the checking account is retrieved from a storage location, as denoted by step 602. The image replacement document template may be retrieved from a suitable storage location, such as image template database 122 (FIG. 1). In one embodiment, the image replacement document template includes a name of the account holder, an address of the account holder, a routing and transit number, and an account number of the checking account.

An image replacement document representative of the check is generated at step 604. In one embodiment, the image replacement document is generated by inserting the payment information received at step 600 into the image replacement document template retrieved at step 602. In one embodiment, the payment information is entered into respective fields on the image replacement document template. These fields may include a date field, a payee field, a dollar amount field, a legal amount field, a signature field, and other suitable fields depending on the payment information received. This insertion facilitates the generation of an image of the completed check with all the hand-written information from the account holder. As denoted above in conjunction with FIG. 5, the image replacement document may also include legal notification section 504, image replacement document identification section 506, and MICR line 508, which is essentially a reproduction of the MICR line of the check.

The image replacement document may then be transmitted to a third party, as denoted by step 606, to complete the check processing. This third party may be any suitable third party, such as a payor bank, a payee bank, or other suitable entity, or may be a shared archive facility, where the image replacement document is stored and used to access by various banks. The transmission may be by electronic means or manual means in which the image replacement document is first printed and then transmitted accordingly. As an example, the image replacement document may be transmitted to the correspondent bank and presented for collection, which is known as image exchange process. This ends the example method outlined in FIG. 6.

Although the present invention is described with several example embodiments, various changes and modifications may be suggested to one skilled in the art. The present invention intends to encompass those changes and modifications as they fall within the scope of the claims.

What is claimed is:

1. A computerized method for effecting payment by a check, comprising:
   electronically receiving payment information for a check for a purchase transaction, the check drawing on a checking account of a particular account holder, the payment information comprising a date, a payee, a dollar amount, a legal amount, and a signature;
   in response to receiving the payment information:
      determining the checking account of the particular account holder based on the payment information from the purchase transaction; and
      retrieving, from a storage location storing a plurality of pre-stored image replacement document templates for a plurality of account holders, an image replacement document template associated with the checking account of the particular account holder used for the purchase transaction, the plurality of account holders comprising the particular account holder; and
   generating, using one or more computers, an image replacement document representative of the check by inserting the payment information into respective fields of the image replacement document template.

2. The computerized method of claim 1, wherein the image replacement document is an electronic document, the method further comprising electronically transmitting the image replacement document to a third party.

3. The computerized method of claim 2, wherein the third party is selected from the group consisting of a payor bank, a payee bank, and the particular account holder for the check.

4. The computerized method of claim 1, further comprising printing the image replacement document and transmitting a printed version of the image replacement document to a third party.

5. The computerized method of claim 4, wherein the third party is selected from the group consisting of a payor bank, a payee bank, and the particular account holder for the check.

6. The computerized method of claim 1, wherein the respective fields comprise a date field, a payee field, a dollar amount field, a legal amount field, and a signature field.

7. The computerized method of claim 1, wherein retrieving the image replacement document template comprises retrieving a name of the particular account holder, an address of the particular account holder, a routing and transit number, and an account number of the checking account.

8. The computerized method of claim 1, wherein generating the image replacement document representative of the check comprises:
   generating an image of a completed check;
   generating an image replacement document identification section;
   generating a legal notification section; and
   generating a MICR section representative of the MICR line of the check.

9. Logic encoded in non-transitory computer-readable storage media for effecting payment by a check, the logic operable to perform the following steps:
   receive payment information for a check for a purchase transaction, the check drawing on a checking account of a particular account holder, the payment information comprising a date, a payee, a dollar amount, a legal amount, and a signature;
   in response to receiving the payment information:
      determine the checking account of the particular account holder based on the payment information from the purchase transaction; and
      retrieve, from a storage location storing a plurality of pre-stored image replacement document templates for a plurality of account holders, an image replacement document template associated with the checking account of the particular account holder used for the purchase transaction, the plurality of account holders comprising the particular account holder; and
      generate an image replacement document representative of the check by inserting the payment information into respective fields of the image replacement document template.

10. The logic encoded in media of claim 9, wherein the image replacement document is an electronic document, the logic further operable to transmit the image replacement document to a third party.

11. The logic encoded in media of claim 10, wherein the third party is selected from the group consisting of a payor bank, a payee bank, and the particular account holder for the check.

12. The logic encoded in media of claim 9, the logic further operable to print the image replacement document for transmission of a printed version of the image replacement document to a third party.

13. The logic encoded in media of claim 12, wherein the third party is selected from the group consisting of a payor bank, a payee bank, and the particular account holder for the check.

14. The logic encoded in media of claim 9, wherein the respective fields comprise a date field, a payee field, a dollar amount field, a legal amount field, and a signature field.

15. The logic encoded in media of claim 9, wherein the image replacement document template comprises a name of the particular account holder, an address of the account holder, a routing and transit number, and an account number of the checking account.

16. The logic encoded in media of claim 9, wherein the image replacement document comprises:
   an image of a completed check;
   an image replacement document identification section;
   a legal notification section; and
   a MICR section representative of the MICR line of the check.

\* \* \* \* \*